United States Patent
Coleman et al.

(10) Patent No.: US 7,562,807 B2
(45) Date of Patent: Jul. 21, 2009

(54) WELD FILLER FOR WELDING DISSIMILAR ALLOY STEELS AND METHOD OF USING SAME

(75) Inventors: Kent K. Coleman, Concord, NC (US); David Wayne Gandy, Concord, NC (US); Ramaswamy Viswanathan, Saratoga, CA (US); William F. Newell, Jr., Mooresville, NC (US)

(73) Assignee: Electric Power Research Institute, Palo Alto, CA (US)

( * ) Notice: Subject to any disclaimer, the term of this patent is extended or adjusted under 35 U.S.C. 154(b) by 78 days.

(21) Appl. No.: 10/839,863

(22) Filed: May 5, 2004

(65) Prior Publication Data

US 2005/0247763 A1  Nov. 10, 2005

(51) Int. Cl.
*B23K 35/00* (2006.01)
*C22C 19/05* (2006.01)

(52) U.S. Cl. .................. 228/262.41; 420/442; 420/452; 420/453

(58) Field of Classification Search ........................ None
See application file for complete search history.

(56) References Cited

U.S. PATENT DOCUMENTS

| | | | | |
|---|---|---|---|---|
| 2,856,281 | A * | 10/1958 | Cremer et al. | 420/434 |
| 3,596,053 | A * | 7/1971 | Kameda et al. | 219/136 |
| 4,110,514 | A * | 8/1978 | Nicholson | 428/683 |
| 4,224,360 | A | 9/1980 | Ohnishi et al. | |
| 4,255,247 | A * | 3/1981 | Oda et al. | 204/293 |
| 4,402,742 | A * | 9/1983 | Pattanaik | 420/50 |
| 4,487,744 | A * | 12/1984 | DeBold et al. | 420/582 |
| 4,653,684 | A | 3/1987 | Saito et al. | |
| 4,702,406 | A * | 10/1987 | Sullivan et al. | 228/200 |
| 4,703,885 | A | 11/1987 | Lindgren et al. | |
| 4,745,037 | A * | 5/1988 | DeCristofaro et al. | 428/678 |
| 4,900,638 | A * | 2/1990 | Emmerich | 428/606 |
| 5,422,071 | A * | 6/1995 | Kiser | 420/73 |
| 5,425,912 | A * | 6/1995 | Smith et al. | 420/447 |
| 5,556,561 | A | 9/1996 | Ishikawa et al. | |
| 6,129,999 | A | 10/2000 | Ueda et al. | |
| 6,162,551 | A * | 12/2000 | Watanabe | 428/627 |
| 6,193,145 | B1 | 2/2001 | Fournier et al. | |
| 6,242,113 | B1 * | 6/2001 | Kiser | 428/680 |
| 6,257,882 | B1 * | 7/2001 | Wyllie, II | 433/8 |
| 6,364,971 | B1 | 4/2002 | Peterson et al. | |
| 6,428,633 | B1 | 8/2002 | Kasuya et al. | |
| 6,489,584 | B1 * | 12/2002 | Kelly | 219/121.46 |
| 6,528,012 | B2 | 3/2003 | Nishimoto et al. | |
| 6,673,169 | B1 | 1/2004 | Peterson et al. | |
| 6,702,906 | B2 * | 3/2004 | Ogawa et al. | 148/428 |
| 2001/0038001 | A1 | 11/2001 | Morikage et al. | |
| 2003/0052110 | A1 | 3/2003 | Gandy et al. | |
| 2004/0079453 | A1 * | 4/2004 | Groh et al. | 148/527 |
| 2005/0095165 | A1 * | 5/2005 | Hardesty et al. | 420/70 |
| 2005/0271542 | A1 * | 12/2005 | Frankel et al. | 420/457 |

FOREIGN PATENT DOCUMENTS

| | | | | |
|---|---|---|---|---|
| DE | 2238688 | A * | 2/1974 | |
| JP | 358120756 | A * | 7/1983 | |
| JP | 362040997 | A * | 2/1987 | |
| JP | 406328290 | A * | 11/1994 | |

OTHER PUBLICATIONS

International Search Report mailed Jan. 4, 2006 corresponding to PCT/US05/15837.
Written Opinion of the International Searching Authority mailed Jan. 4, 2006 corresponding to PCT/US05/15837.

* cited by examiner

*Primary Examiner*—Kiley Stoner
(74) *Attorney, Agent, or Firm*—Kilpatrick Stockton LLP

(57) ABSTRACT

Accordingly, the present invention provides a weld filler composition for joining different alloy steel pieces with substantially different chromium content, such as joining low alloy ferritic steel to high alloy ferritic steel, low alloy ferritic steel to austenitic stainless steel, or high alloy ferritic steel to austenitic stainless steel, and a method using the same. In one embodiment, the present invention provides a composition for a weld filler comprising nickel, iron, and chromium, which collectively comprise at least 50% by weight of the weld filler; niobium, carbon, manganese, molybdenum, and silicon, which collectively comprise no more than 50% by weight of the weld filler, and a niobium to carbon ratio of approximately 20 or less.

24 Claims, No Drawings

WELD FILLER FOR WELDING DISSIMILAR ALLOY STEELS AND METHOD OF USING SAME

BACKGROUND OF THE INVENTION

1. Field of the Invention

The present invention generally relates to welding. More specifically, the present invention is directed to a weld filler composition for use in welding together steel pieces with different alloy content to reduce the stress between the joints of the steel pieces.

2. Description of Related Art

In many high temperature piping and tubing applications, it is frequently necessary to join materials with different chemical compositions. As equipment operating temperatures and pressures increase, piping and tubing components require higher alloyed materials. Yet, it is more expensive to produce entire components from higher alloyed materials, so a combination of low alloyed and higher alloyed materials are often employed as a means to reduce cost. This cost-savings measure requires the ability to join materials with different alloy contents. For example, it may be desirable to weld ferritic steel, which is a low alloy steel, and austenitic steel, which is a high alloy content steel.

However, there are issues regarding components that are made by welding materials with different compositions. For example, components utilized in high temperature applications frequently experience thermal gradients between operation and shut down times. Since there is a difference in the coefficient of thermal expansion for each material, high stresses at the weld joint may be experienced as a result of such thermal gradients.

To address the high stresses experienced at the weld joint, various approaches for joining different materials have been attempted in the past. One approach is to use a filler metal that has a coefficient of thermal expansion that is in between the coefficient of thermal expansion of the two different materials. Another approach is to form a joint with a continuously changing chemical composition from one joined piece to the other, for example, by electroslag techniques. Another approach is to employ the use of powder metallurgy components to form these joints. Heat treatment has also been employed both prior to and following the formation of these joints to better condition the transition joint and interconnecting bonds to withstand severe operating conditions. Yet, these techniques have been met with mixed results, leaving room for improvement.

Another technique includes the use of stepped transition joints, in which a member is pre-formed from a plurality of sections that are welded together. The sections of the member are selected to generally provide a gradient of chemical composition and physical properties between the materials being joined together. For instance, the chromium content and the thermal coefficient of expansion of several segments are progressively graded between one end of the member and the other. While such stepped transition joints have generally been found to work well, multiple welded members are relatively expensive.

In the utility industry, the service life of weld joints between dissimilar materials has been less than desired. In addition to the problems associated with the differences between the coefficient of thermal expansion in each material, carbon migration causes short service life in these joints. Carbon migration occurs whenever the weld joint is subjected to elevated temperature conditions. The primary area of concern for this phenomenon is in the interface between ferritic steel and a filler metal. Carbon tends to increase in concentration in the weld or filler metal proximate to the base metal. Carbon generally transfers from the base metal to the filler metal producing a structure of weak carbides in the filler metal and a weak zone in the base metal having a lower carbon concentration.

Another problem that plagues the weld joint of dissimilar materials is micro-fissuring. Over time, micro-fissuring creates stress and fatigue in the weld joint, ultimately leading to its eventual failure. By reducing or eliminating micro-fissuring, the life of the weld joint can be prolonged. The longer life of a weld joint can translate into a substantial cost savings over the life of various equipment or plumbing parts.

Therefore, an improved filler composition or weld formulation for joining dissimilar materials is highly desired. Such a filler composition may address the problems associated with welded joints between dissimilar materials such as issues related to the difference in the coefficient of thermal expansion, carbon migration and micro-fissuring.

SUMMARY OF THE INVENTION

Accordingly, the present invention provides a weld filler composition for joining different alloy steel pieces with substantially different chromium content, such as joining low alloy ferritic steel to high alloy ferritic steel, low alloy ferritic steel to austenitic stainless steel, or high alloy ferritic steel to austenitic stainless steel, and a method using the same.

In one embodiment, the present invention provides a composition for a weld filler comprising: nickel, iron, and chromium, which collectively comprise at least 50% by weight of the weld filler; niobium, carbon, manganese, molybdenum, and silicon, which collectively comprise no more than 50% by weight of the weld filler; and a niobium to carbon ratio approximately 20 or less.

In another embodiment, the composition for the weld filler comprises approximately 42% by weight or less iron, 10% by weight or less chromium, 1.5% by weight or less niobium, 0.12% by weight or less carbon, 2% by weight or less manganese, 2.5% by weight or less molybdenum, 0.5% by weight or less silicon, the balance nickel, and a niobium to carbon ratio of approximately 20 or less.

The present invention also provides a method of welding comprising providing a first steel work piece having a chromium content of less than approximately 12%; providing a second steel work having a chromium content greater than approximately 5% and also greater than the chromium content of the first steel work piece; and using a weld filler to form a joint between the first steel work piece and the second steel work piece, wherein the weld filler comprises nickel, iron, and chromium, which collectively comprise at least 50% by weight of the weld filler; niobium, carbon, manganese, molybdenum, and silicon, which collectively comprise no more than 50% by weight of the weld filler; and a niobium to carbon ratio of approximately 20 or less.

In another embodiment, the method comprises providing a first steel work piece having a chromium content of less than approximately 12%; providing a second steel work having a chromium content greater than approximately 5% and also greater than the chromium content of the first steel work piece; and using a weld filler to form a joint between the first steel work piece and the second steel work piece, wherein the weld filler comprises approximately 10% by weight or less chromium, 2.5% by weight or less molybdenum, 42% by weight or less iron, 1.5% by weight or less niobium, 2% by weight or less manganese, 0.5% by weight or less silicon, 0.12% by weight or less carbon, the balance nickel, and a niobium to carbon ratio of approximately 20 or less.

Other features of the present invention will appear from the following description from which the preferred embodiments are set forth in detail.

DESCRIPTION OF THE PREFERRED EMBODIMENTS

Generally, the present invention provides an improved weld filler composition and method for joining different alloy steel pieces. More specifically, the present invention provides an improved weld filler composition and method for joining different alloy steel pieces with substantially different chromium content, such as joining low alloy ferritic steel to high alloy ferritic steel, low alloy ferritic steel to austenitic stainless steel, or high alloy ferritic steel to austenitic stainless steel. The present invention also provides an improved weld filler composition and method that reduces the stress on the joint between the work pieces and prolongs the life of the weld joint by reducing or eliminating micro-fissuring of the weld joint and reducing the amount of carbon migration. The following text describes various embodiments of the present invention; however, it is not intended to limit the scope of the present invention. It should be appreciated that percentages referred to are weight percentages unless otherwise noted.

In one embodiment, the present invention provides a weld filler composition to form a weld joint between two different alloy steel pieces, such as joining a low alloy ferritic steel piece to a high alloy ferritic steel piece, a low alloy ferritic steel piece to an austenitic stainless steel piece, or a high alloy ferritic steel piece to an austenitic stainless steel piece. It should be appreciated that the use of the term "low alloy ferritic steel" or "low alloy steel" refers to a steel similar to carbon steel, which are steels having 5% or less chromium, while "high alloy ferritic steel" has a chromium content of 5-12%. The use of the term "stainless" steel refers to ferrous alloys that have a minimum of 12% chromium by weight, which includes austenitic stainless steel. Generally, however, austenitic steel has a chromium content of 15% or more.

The weld filler has a composition of about 0.07-0.12% C, 0-0.5% Si, 0.8-2.0% Mn, 8.0-10.0% Cr, 1.5-2.5% Mo, 35-42% Fe, 0.9-1.5% Nb, and the balance Ni. For the weld filler to perform as intended, it is also permissible to have low levels of tramp elements, such as up to 0.010% P and/or 0.010% S and trace amounts of tantalum, which may be present as a result of using niobium.

Various components in the above weld filler composition help prolong the life of the weld joint by addressing specific issues. For example, to compensate for the difference in the coefficient of thermal expansion between the two steel pieces being welded, particular quantities of chromium may be incorporated into the weld filler because of the disparity in the chromium content of the two steel pieces, especially when joining a low alloy ferritic steel piece to an austenitic stainless steel piece wherein the difference in the chromium content may be 10% by weight or more. To offset the difference in the chromium content of the two steel pieces, the weld filler composition should include a chromium content that is between the chromium content of the two steel pieces to be joined, such as a chromium content of approximately 8-10% by weight.

The addition of chromium to the weld filler composition also enhances or helps maintain the mechanical strength of the weld joint so that the weld joint can better withstand high temperature and/or high pressure conditions. Chromium is especially useful in providing resistance to thermal cracking.

Other components in the weld filler also strengthen the weld joint. For instance, the addition of molybdenum is helpful in this regard, as well as providing resistance against corrosion. Silicon may also be added as a deoxidizer, and its addition can serve to strengthen the weld joint.

Despite carbon migration problems, some amount of carbon may also be used in the weld filler to maintain the mechanical strength of the weld joint. Preferably a small quantity of carbon is added to provide mechanical strength of the weld joint so as to limit the amount of carbon migration that may take place at the interface of the two steel pieces and the filler metal. The quantity of carbon that can be added is preferably about 0.07-0.12%, which represents an amount of carbon that provides mechanical strength and minimizes carbon migration in the weld joint.

The degree of carbon migration can also be retarded or mitigated by further adjusting the chemistry of the weld filler. This may be accomplished by adding another element that could stabilize carbon and the resulting carbides, such as niobium. However, the quantity of niobium in the weld filler composition should be relatively small because excessive amounts of niobium may impair the strength of the weld joint. A preferred amount of niobium is approximately 0.9-1.5% by weight. In a preferred embodiment, the ratio of niobium to carbon should be approximately 20 or less and preferably about 10 to 20. This niobium to carbon ratio is also important because it can reduce or eliminate micro-fissuring.

In another embodiment, the present invention provides a method of joining two different alloy steel pieces, such as joining low alloy ferritic steel to high alloy ferritic steel, low alloy ferritic steel to austenitic stainless steel, or high alloy ferritic steel to austenitic stainless steel. Such alloy steel pieces can be joined together by welding with a weld filler composition as described above. This method of joining two different alloy steel pieces can be used to form a variety of joints such as, but not limited to, fillet welds, butt welds, lap welds, corner welds and edge welds. The welding of the steel pieces with this weld filler can be achieved by any means known in the art in which sufficient heat can be delivered to melt the weld filler to facilitate the fusion of the steel pieces. Examples of welding techniques include, but are not limited to, gas welding, arc welding, electron beam welding (EBW), laser beam welding (LBW), and electroslag welding. Further, arc welding includes carbon arc, flux-cored arc, shielded metal arc, gas metal arc, gas tungsten arc, plasma transferred arc and submerged arc.

The weld filler composition may be supplied in various forms, such as bare wires or rods, electrodes, flux, powder, or combinations thereof. The choice between bare wires, electrodes, flux or powder depends on which type of welding technique is used. For example, a bare wire or rod may be used to supply the weld filler in gas welding or gas tungsten arc welding, in which the wire or rod does not carry current and is not attached to an electrical current source. In both gas welding and gas tungsten arc welding, the weld filler composition is delivered to the joint area when the wire or rod melts upon the application of heat, thereby providing the weld filler. The heat source in gas welding is a gas flame, whereas the heat source in gas tungsten arc welding is an electric arc that is generated by a tungsten electrode. Specific to gas tungsten arc welding, it should be appreciated that the tungsten electrode does not provide any material to the weld. Such an electrode is also known as a non-consumable electrode, in which the electrode tip does not melt to form a part of the weld.

The wire or rod may be made through any means known in the art such as extruding molten filler materials through a die, in which the shape and size of the die affects the cross-sectional geometry and the diameter of the wire or rod. Any suitable cross-sectional geometry can be used. The diameter or thickness of the wire or rod can vary, depending on the desired melting rate where a thicker wire or rod would give a slower melting rate.

The composition of wire or rod may be the same or may vary along its length to control the delivery of the filler components to the weld. For example, the composition of the wire or rod may be consistent along its length, it may gradually change along its length, or it may be discretely changed along its length. In the case of a wire, the "wire" may alternatively comprise a plurality of thinner wires that contain various components of the filler composition, in which the thinner wires are bound or twisted together to form a larger "single" wire. Alternatively, separate wires each having different compositions can be added during the gas welding process to provide the desired weld filler composition.

In other forms of arc welding, such as shielded metal arc, submerged arc, gas metal arc, flux-cored arc and metal-cored arc welding, an electrode is used to provide at least some portion of the weld filler material. In shielded metal arc, submerged arc and flux-cored arc, a flux may be used to contribute to the weld filler composition. In this context, the flux may be embodied with the electrode or embodied separately from the electrode.

With respect to these other forms of arc welding, the arc welder's electrode not only generates an electric arc to provide heat, but its tip also melts thereby contributing the molten material to the weld filler. This type of electrode is also known as a consumable electrode. The electrode is structurally similar to the wire or rod, except that it is connected to an electrical current source. Moreover, the electrode may be either a bare electrode, a coated electrode, a flux-cored electrode or a metal-cored electrode. The selection of an appropriate electrode depends upon the type of arc welding technique. For example, gas metal arc and submerged arc welding use a bare electrode. Shielded metal arc welding uses a coated electrode. Flux-cored arc welding uses a flux-cored electrode. Metal-cored arc welding uses a metal-cored electrode.

In the case of gas metal arc and submerged arc welding, the bare electrode supplies the requisite amount of heat through the electric arc and consequently melts thereby providing the filter material for the weld. The bare electrode comprises only a core wire and can be used and manufactured in a similar manner as the wires described above for gas welding and gas tungsten arc welding. However, the weld filler in submerged arc welding may also derive a portion of its composition from a granular flux used to surround the electrode and work pieces and shield the electric arc generated by the electrode. Because the weld may be formed from both the electrode tip and granular flux, the weld filler composition may be distributed partially in the bare electrode and partially in the granular flux. The filler material in the granular flux should be dispersed evenly within the individual flux granules because of the random position in which the individual flux granules cover the electrode and work piece.

When using shielded metal arc welding to form a weld, a coated electrode is used to generate the electric arc to melt the electrode tip. The coated electrode comprises a flux coating that surrounds the core wire. The flux coating provides a gaseous shield during welding and a means to add other elements to the filler composition through its melting. As a result, portions of the weld filler composition can be in the core wire and the other portions can be in the flux coating. Alternatively, the entire weld filler composition may be contained in the core wire, with the flux coating only providing the gaseous shield. The core wire can be produced by any of the methods known in the art, such as the ones mentioned with the bare wire or rod used in gas welding. The core wire may have an even distribution of filler material along its length, a graduated concentration of filler material, or a series of different cross-sectional layers of filler material along its length. After the core wire has been formed, the flux material may be coated over the core wire. Similar to the core wire, the flux coating may also have an even distribution of filler material, a graduated concentration of filler material, or a series of cross-sectional layers of filler material may be used.

In flux-cored arc welding, the flux-cored electrode generates the electric arc to supply the needed heat to melt the electrode tip. The flux-cored electrode comprises a flux-containing core, which may supply the filler composition and provide a gaseous shield during welding. To contain and protect the flux material, a metal sheath covers the outer surface of the flux-cored electrode. Because of this design, portions of the weld filler composition can be in the flux core and the other portions can be in the metal sheath. Alternatively, the entire weld filler composition may be contained in the metal sheath, with the flux core merely providing a gaseous shield. The flux core generally comprises granular flux contained in a flat metal strip that is rolled up to form the metal sheath and to thereby hold the flux material. Any means known in the art may be used to manufacture the granular flux and the metal sheath, but several considerations must be addressed. Because the granular flux may contribute to the weld filler composition, the weld filler should be evenly distributed within the individual granules since these granules move randomly during the manufacturing process when the metal sheath is filled. As for the metal sheath, there are a variety of ways to incorporate the weld filler composition into the flat metal strip, such as distributing the filler composition evenly along the strip, spreading the filler composition in graduated concentrations across the strip, or creating cross-sectional layers of the components of the filler composition.

In metal-cored arc welding, a metal-cored electrode is used to generate the electric arc to melt the electrode tip. The metal-cored electrode has a core that contains metallic powder, such as iron, and a metal sheath that covers the outer surface of the electrode. The process of incorporating the weld filler of the present invention into a metal-cored electrode may be similar to the one described for flux-cored electrodes because the design of a metal-cored electrode is similar to a flux-cored electrode, except that a metallic powder is introduced to the core that is contained in a metal sheath. The metallic powder may comprise one or more metal components used in the weld filler. If the metallic powder comprises more than one metal component of the weld filler, then the weld filler components should be evenly distributed within the powder because of the random placement of the individual powder particles within the metal sheath. The metal sheath may also comprise one or more metal components of the weld filler. Any means known in the art may be used to produce the metal sheath and to incorporate the weld filler components. For example, the metal sheath may be a flat metal strip as in the case of the flux-cored electrode, in which the weld filler composition is distributed evenly, in graduated concentrations, or in cross-sectional layers across the strip, which is then rolled to contain the powder.

In addition to weld filler materials derived from bare wires or rods, bare electrodes, coated electrodes, flux-cored electrodes, metal-cored electrodes, and granular fluxes, the weld filler composition in the above embodiments can also be in powder form. The use of powder is typically associated with plasma transferred arc welding and laser beam welding. The powder weld filler can be made by any means known in the art. For example, molten filler material can be drawn into sheets that are easily ground into a powder. The weld filler composition should be evenly distributed before grinding, so that the weld filler components will be evenly dispersed in the powder. The weld filler can be used directly in powder form. As mentioned earlier, powder weld filler may be used in plasma transferred arc welding or laser beam welding. Powder weld filler can also be dispersed in a paste or cement, for use as soldering or brazing paste.

Furthermore, one of skill in the art can also readily deliver the weld filler composition through different combinations of electrodes, wires, and powders. For example, a coated electrode can deliver some portion of the weld filler composition with the introduction of additional wires and powders for the delivery of the other portions of the weld filler composition. With some sort of gas shielded arc welding, bare electrode and bare wires can be used, along with powder, to deliver the weld filler material. Perhaps granular flux and powder, in combination with a bare electrode, can supply the weld filler materials when employing submerged arc welding.

While the foregoing description represent various embodiments of the present invention, it should be appreciated that the foregoing description should not be deemed limiting since additions, variations, modification and substitutions may be made without departing from the spirit and scope of the present invention. It will be clear to one of skill in the art that the present invention may be embodied in other forms, structures, arrangements, proportions and using other elements, materials and components. For example, although the method is described in connection with the welding of low alloy ferritic steel piece and high alloy ferritic steel piece or an austenitic stainless steel piece and the welding of high alloy ferritic steel piece and an austenitic stainless steel piece, the composition and method can be adapted to the welding of other steel or metal-alloy pieces that have a sizeable chromium content difference between the welded pieces. The present disclosed embodiments are, therefore, to be considered in all respects as illustrative and not restrictive, the scope of the invention being indicated by the appended claims and not limited to the foregoing description.

What is claimed is:

1. A weld filler composition, comprising:
   nickel, iron, and chromium, which collectively comprise at least 50% by weight of a weld filler and wherein said nickel comprises approximately 41-54% by weight of said weld filler, said iron comprises approximately 35-42% by weight of said weld filler, and said chromium comprises approximately 8-10% by weight of said weld filler;
   niobium, carbon, manganese, molybdenum, and silicon, which collectively comprise no more than 50% by weight of said weld filler; and
   a niobium to carbon ratio of approximately 10 to 20.

2. The composition of claim 1, wherein said niobium comprises approximately 0.9-1.5% by weight of said weld filler.

3. The composition of claim 1, wherein said carbon comprises approximately 0.07-0.12% by weight of said weld filler.

4. The composition of claim 1, wherein said manganese comprises approximately 0.8-2.0% by weight of said weld filler.

5. The composition of claim 1, wherein said molybdenum comprises approximately 1.5-2.5% by weight of said weld filler.

6. The composition of claim 1, wherein said silicon comprises approximately 0.5% by weight or less of said weld filler.

7. A method of welding, comprising:
   providing a first steel work piece having a chromium content of less than approximately 12% by weight;
   providing a second steel work piece having a chromium content greater than approximately 5% by weight and also greater than said chromium content of said first steel work piece; and
   welding with a weld filler to form a joint between said first steel work piece and said second steel work piece, wherein said weld filler comprises nickel, iron and chromium, which collectively comprise at least 50% by weight of said weld filler and wherein said nickel comprises approximately 41-54% by weight of said weld filler and said chromium is approximately 8-10% by weight of said weight filler, and niobium, carbon, manganese, molybdenum and silicon, which collectively comprise no more than 50% by weight of said weld filler, and having a niobium to carbon ratio of approximately 10 to 20.

8. The method of claim 7, wherein said first type of steel comprises a low alloy ferritic steel or a high alloy ferritic steel.

9. The method of claim 7, wherein said second type of steel comprises high alloy ferritic steel or austenitic stainless steel.

10. The method of claim 7, wherein said iron comprises approximately 35-42% by weight of said weld filler.

11. The method of claim 7, wherein said niobium comprises approximately 0.9-1.5% by weight of said weld filler.

12. The method of claim 7, wherein said carbon comprises approximately 0.07-0.12% by weight of said weld filler.

13. The method of claim 7, wherein said manganese comprises approximately 0.8-2% by weight of said weld filler.

14. The method of claim 7, wherein said molybdenum comprises approximately 1.5-2.5% by weight of said weld filler.

15. The method of claim 7, wherein said silicon comprises approximately 0.5% by weight of said weld filler.

16. The method of claim 7, wherein said weld filler further comprises about 1.5-2.5% molybdenum, 35-42% iron, 0.9-1.5% niobium, 0.8-2% manganese, 0.5% or less silicon, and 0.07-0.12% carbon.

17. A method of welding, comprising:
   providing a first steel work piece having a chromium content of less than approximately 12% by weight;
   providing a second steel work piece having a chromium content greater than approximately 5% by weight and also greater than said chromium content of said first steel work piece; and
   welding with a weld filler to form a joint between said first steel work piece and said second steel work piece, wherein said weld filler comprises approximately 8-10% by weight chromium, 2.5by weight or less molybdenum, 42% by weight or less iron, 1.5% by weight or less niobium, 2% by weight or less manganese, 0.5% by weight or less silicon, 0.12% by weight or less carbon, a balance comprising nickel, and a niobium to carbon ratio of approximately 10 to 20.

18. The method of claim 17, wherein said weld filler further comprises approximately 1.5-2.5% by weight molybdenum, 35-42% by weight iron, 0.9-1.5% by weight niobium, 0.8-2% by weight manganese, and 0.07-0.12% by weight carbon.

19. A method of welding, comprising:
   providing a first steel work piece made of a material comprising low alloy ferritic steel or high alloy ferritic steel;

providing a second steel work piece made of a material comprising high alloy ferritic steel or austenitic stainless steel; and welding with a weld filler to form a joint between said first steel work piece and said second steel work piece, wherein said weld filler comprises approximately 8-10% by weight chromium, 2.5% by weight or less molybdenum, 42% by weight or less iron, 1.5% by weight or less niobium, 2% by weight or less manganese, 0.5% by weight or less silicon, a balance comprising nickel, and a niobium to carbon ratio between 10 to 20.

20. The method of claim 19, wherein said weld filler further comprises approximately 1.5-2.5% by weight molybdenum, 35-42% by weight iron, 0.9-1.5% by weight niobium, 0.8-2% by weight manganese, and 0.07-0.12% by weight carbon.

21. A method of welding, comprising:

providing a first steel work piece having a chromium content of less than approximately 12% by weight;

providing a second steel work piece having a chromium content greater than approximately 5% by weight and also greater than said chromium content of said first steel work piece; and welding with a weld filler to form a joint between said first steel work piece and said second steel work piece, wherein said weld filler comprises:

nickel, iron and chromium, which collectively comprise at least 50% by weight of said weld filler, and wherein said nickel comprises approximately 41-54% by weight of said weld filler, said chromium is approximately 8-10% by weight of said weight filler, and iron is approximately 35-42% by weight of said weld filler;

niobium, carbon, manganese, molybdenum and silicon, which collectively comprise no more than 50% by weight of said weld filler, and wherein said niobium comprises approximately 0.9-1.5% by weight of said weld filler, said carbon comprises 0.07-0.12% by weight of said weld filler, said manganese comprises 0.8-2% by weight of said weld filler, said molybdenum comprises approximately 1.5-2.5% by weight of said weld filler, and said silicon comprises 0.5% or less by weight of said weld filler; and a niobium to carbon ratio of approximately 20 or less.

22. A method of welding, comprising:

providing a first steel work piece having a chromium content of less than approximately 12% by weight;

providing a second steel work piece having a chromium content greater than approximately 5% by weight and also greater than said chromium content of said first steel work piece; and welding with a weld filler to form a joint between said first steel work piece and said second steel work piece, wherein said weld filler comprises nickel, iron and chromium, which collectively comprise at least 50% by weight of said weld filler, and wherein said nickel comprises approximately 41-54% by weight of said weld filler and said chromium is approximately 8-10% by weight of said weight filler, and niobium, carbon, manganese, and molybdenum, wherein said carbon comprises 0.07-0.12% by weight of said weld filler.

23. The method of welding of claim 22, wherein the weld filler further comprises silicon.

24. The method of welding of claim 22, wherein the weld filler comprises a niobium to carbon ratio of approximately 20 or less.

* * * * *